United States Patent
Cao

(10) Patent No.: US 11,595,852 B2
(45) Date of Patent: *Feb. 28, 2023

(54) WIRELESS ACCESS POINT SOFTWARE APPLICATION FOR CLASSIFYING NETWORK DATA PACKETS TO IMPROVE PACKET FORWARDING PERFORMANCE

(71) Applicant: Agora Lab, Inc., Santa Clara, CA (US)

(72) Inventor: Yue Cao, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,925

(22) Filed: Apr. 25, 2022

(65) Prior Publication Data

US 2022/0248270 A1 Aug. 4, 2022

Related U.S. Application Data

(63) Continuation of application No. 16/926,871, filed on Jul. 13, 2020, now Pat. No. 11,350,314.

(51) Int. Cl.
| | |
|---|---|
| *H04W 28/00* | (2009.01) |
| *H04W 28/10* | (2009.01) |
| *H04L 47/2425* | (2022.01) |
| *H04W 76/10* | (2018.01) |
| *H04W 72/12* | (2023.01) |
| *H04L 47/2441* | (2022.01) |
| *H04W 84/12* | (2009.01) |

(52) U.S. Cl.
CPC ......... *H04W 28/10* (2013.01); *H04L 47/2433* (2013.01); *H04L 47/2441* (2013.01); *H04W 72/1242* (2013.01); *H04W 76/10* (2018.02); *H04W 84/12* (2013.01)

(58) Field of Classification Search
None
See application file for complete search history.

(56) References Cited

U.S. PATENT DOCUMENTS

| | | |
|---|---|---|
| 7,778,194 B1 | 8/2010 | Yung |
| 9,292,414 B2 | 3/2016 | Kiel et al. |
| 9,306,829 B1 | 4/2016 | Boyle et al. |
| 9,320,019 B2 | 4/2016 | Gallagher et al. |
| | (Continued) | |

FOREIGN PATENT DOCUMENTS

WO WO-2017176247 A1 * 10/2017 ......... H04L 41/5025

*Primary Examiner* — Gerald A Smarth
(74) *Attorney, Agent, or Firm* — The Law Offices of Konrad Sherinian, LLC; Depeng Bi

(57) ABSTRACT

A wireless access point software application, adapted to be run within a wireless access point, classifies network data packets with classification identifiers provided by RTC/RTE devices without scanning the content of them. The wireless access point software application receives inbound and outbound packet classification identifiers from the RTC/RTE applications running on the RTC/RTE devices. The identifiers are provided to a hardware data packet classifier. The hardware data packet classifier applies the identifiers against ingress packets and egress packets respectively. Data packets of the same class are assigned with a same priority. The prioritized network data packets are scheduled for transmission based on their respective priorities. The scheduled network data packets are forwarded to respective network interfaces for transmission.

7 Claims, 10 Drawing Sheets

(56) References Cited

U.S. PATENT DOCUMENTS

| | | | |
|---|---|---|---|
| 9,805,202 B2 | 10/2017 | Medeiros et al. | |
| 2004/0174865 A1* | 9/2004 | O'Neill | H04L 69/166 |
| | | | 370/352 |
| 2010/0054129 A1 | 3/2010 | Kuik | |
| 2016/0156673 A1* | 6/2016 | Emmanuel | H04W 4/38 |
| | | | 370/338 |
| 2016/0219462 A1* | 7/2016 | Anderson | H04L 47/522 |
| 2016/0112166 A1 | 11/2016 | Hundal et al. | |
| 2018/0159801 A1 | 6/2018 | Rajan | |
| 2019/0141572 A1* | 5/2019 | Zaks | H04W 12/106 |

* cited by examiner

WIRELESS ACCESS POINT SOFTWARE APPLICATION FOR CLASSIFYING NETWORK DATA PACKETS TO IMPROVE PACKET FORWARDING PERFORMANCE

CROSS REFERENCE TO RELATED APPLICATIONS

This application is a continuation of co-pending U.S. patent application Ser. No. 16/926,871, entitled "SYSTEM AND METHOD FOR CLASSIFYING NETWORK DATA PACKETS WITH PROVIDED CLASSIFIER IDENTIFIERS", filed Jul. 13, 2020, which is hereby incorporated by reference in its entirety. This application is related to U.S. patent application Ser. No. 16/922,093, entitled "SYSTEM AND METHOD FOR PROVIDING UPSTREAM DIRECTIVES BASED ON UPSTREAM SIGNAL QUALITY OF WIRELESS NETWORK IN REAL-TIME COMMUNICATION," filed Jul. 7, 2020, assigned to Agora Lab, Inc. of Santa Clara, Calif., and which is hereby incorporated by reference. This application is also related to U.S. patent application Ser. No. 16/926,855, entitled "SYSTEM AND METHOD FOR AUTOMATICALLY SWITCHING REAL-TIME COMMUNICATION DEVICE TO NEW BASIC SERVICE SET," filed Jul. 13, 2020, assigned to Agora Lab, Inc. of Santa Clara, Calif., and which is hereby incorporated by reference.

FIELD OF THE DISCLOSURE

The present invention generally relates to real-time communication or real-time engagement ("RTC/RTE") over a wireless network, and more particularly relates to a system and method for classifying network data packets with classifier identifiers provided from RTC/RTE devices. More particularly still, the present disclosure relates to a system and method for classifying network data packets by hardware with classifier identifiers provided from RTC/RTE devices.

DESCRIPTION OF BACKGROUND

Wi-Fi is a family of wireless networking technologies that are based on the IEEE 802.11 family of technical standards. Wi-Fi (also referred to herein as WiFi) technologies are commonly used for local area networking of electronic devices and Internet access. The electronic devices can be smartphones, tablet computers, laptop computers, desktop computers, and other types of devices. A Wi-Fi access point creates a local wireless network, and is operatively coupled to the Internet via, for example, a broadband modem. The broadband modem bridges the communication between the Wi-Fi access point and the Internet. Electronic devices access the Wi-Fi access point to access the Internet and communicate with each other. The Wi-Fi access point could also be a Wi-Fi hotspot. In such a case, the Wi-Fi hotspot can be created from, for example, a wireless access point, or a smartphone that accesses a public cellular network for accessing the Internet. The Wi-Fi hotspot can be provided by, for example, a public cellular network. As used herein, Wi-Fi access points and Wi-Fi hotspots are collectively referred to as Wi-Fi access points.

Electronic devices access the Wi-Fi network for many purposes. For instance, a mobile device (such as a smartphone, a tablet computer or a laptop computer) or a desktop computer runs a real-time communication application or real-time engagement application for text, audio, voice, video or both voice and video communication, such as instant messaging, voice over IP ("VoIP"), video teleconferencing, and online virtual meeting. Real-time communication ("RTC") and real-time engagement ("RTE") are the near simultaneous exchange of information over any type of telecommunications service with negligible latency. The immediacy of RTC/RTE is critically important for users. RTC/RTE software applications can be built in compliance with, for example, the Web Real-Time Communication ("WebRTC") framework.

An RTC/RTE software application running on a wirelessly networked device sends data (such as voice data, video data, text data, etc.) from the electronic device on which it is running to other electronic devices or servers. The data is sent from the electronic device to the Wi-Fi access point in the form of wireless signals, and referred to herein as upstream. The RTC/RTE software application also receives data (such as voice data, video data, text data, etc.) from other electronic devices or servers. The data is sent from the Wi-Fi access point to the electronic device in the form of wireless signals as well, and referred to herein as downstream. Downstream is received by the electronic device from the Wi-Fi access point while upstream is transmitted by the electronic device to the Wi-Fi access point.

The quality of the Wi-Fi access point's Wi-Fi signal can vary depending on the relative location, interference from other devices, the number of electronic devices on a particular wireless channel, conditions under which a mobile device accesses the Wi-Fi access point, and other factors. When the quality of the Wi-Fi signal is lower, the quality of users' experience ("QoE") of the RTC/RTE application becomes lower. QoE can be described and measured by a number of parameters, such as video resolution, choppy video time, video sharpness (also known as video clarity) and choppy audio time, latency, etc.

To maintain the immediacy of real-time communication or real-time engagement and a high level QoE, one conventional solution is to have a software application scan received network packets for the purpose of identifying the categories of them, and assign different priorities to the packets. Time critical packets, such as those for real-time communication or real-time engagement, are assigned with a higher priority. Packets with higher priorities are forwarded to the target network interface for transmission before packets with lower priorities. However, the classification process is time consuming. Accordingly, it is desirable for an improved Wi-Fi access point and method to perform the classification with classifier identifiers provided by the RTC/RTE devices to avoid the scanning of the packets and thus achieve better performance. Furthermore, it is desirable for the improved Wi-Fi access point to classify the network packets at the hardware layer to achieve better performance by providing the classification identifiers to the hardware classifier.

SUMMARY OF THE DISCLOSURE

Generally speaking, pursuant to the various embodiments, the present disclosure provides a method for classifying network data packets by a hardware data packet classifier to improving packet forwarding performance. The method is performed by a wireless access point and includes creating a socket with a predetermined port on an IP address of the wireless access point; establishing a connection with a first RTC/RTE device over the socket; receiving a set of inbound data packet classification identifiers from the first RTC/RTE device; receiving a set of outbound data packet classification identifiers from the first RTC/RTE device; providing the set of inbound data packet classification identifiers to a hardware data packet classifier; providing the set of outbound data packet classification identifiers to a hardware data packet classifier; receiving a set of inbound data packets from a second RTC/RTE device from a wired network interface of the wireless access point; applying the set of inbound data packet classification identifiers to the set of inbound data packets by the hardware data packet classifier to generate a set of classified inbound data packets; assigning a same priority to data packets of a same class within the set of classified inbound data packets to generate a set of prioritized inbound data packets; scheduling the set of prioritized inbound data packets for transmission, thereby forming a set of scheduled inbound data packets; forwarding the set of scheduled inbound data packets to a wireless network interface for transmission to the first RTC/RTE device; receiving a set of outbound data packets from the first RTC/RTE device from the wireless network interface; applying the set of outbound data packet classification identifiers to the set of outbound data packets by the hardware data packet classifier to generate a set of classified outbound data packets; assigning a same priority to data packets of a same class within the set of classified outbound data packets to generate a set of prioritized outbound data packets; scheduling the set of prioritized outbound data packets for transmission, thereby forming a set of scheduled outbound data packets; and forwarding the set of scheduled outbound data packets to the wired network interface for transmission to the second RTC/RTE device. In one implementation, the wireless access point is a Wi-Fi access point and the predetermined port is a TCP port or a UDP port. The method further includes enabling the hardware data packet classifier. In one implementation, the set of inbound packet classification identifiers includes at least one of an MAC address of the first RTC/RTE device, an MAC address of the second RTC/RTE device if it is in same L2 network with first RTC/RTE device, an IP address of the first RTC/RTE device, and an IP address of the second RTC/RTE device; and the set of outbound packet classification identifiers includes at least one of an MAC address of the first RTC/RTE device, an MAC address of the second RTC/RTE device if it is in same L2 network with first RTC/RTE device, an IP address of the first RTC/RTE device, and an IP address of the second RTC/RTE device. The method can further includes binding the socket to the IP address; and listening to the socket for connection requests from RTC/RTE devices including the first RTC/RTE device.

Further in accordance with the present teachings is an improved wireless access point. The improved wireless access point includes a processing unit; a memory operatively coupled to the processing unit; a set of LED indicators operatively coupled to the processing unit; a wireless network interface operatively coupled to the processing unit; a power module operatively coupled to the processing unit; a wired wide area network interface operatively coupled to the processing unit; a hardware data packet classifier operatively coupled to the processing unit; an operating system executed by the processing unit; and a wireless access point application running over the operating system. The wireless access point application is adapted to create a socket with a predetermined port on an IP address of the wireless access point; establish a connection with a first RTC/RTE device over the socket; receive a set of inbound data packet classification identifiers from the first RTC/RTE device; receive a set of outbound data packet classification identifiers from the first RTC/RTE device; provide the set of inbound data packet classification identifiers to a hardware data packet classifier; provide the set of outbound data packet classification identifiers to a hardware data packet classifier; receive a set of inbound data packets from a second RTC/RTE device from a wired network interface of the wireless access point, wherein the hardware data packet classifier applies the set of inbound data packet classification identifiers to the set of inbound data packets by the hardware data packet classifier to generate a set of classified inbound data packets; assign a same priority to data packets of a same class within the set of classified inbound data packets to generate a set of prioritized inbound data packets; schedule the set of prioritized inbound data packets for transmission, thereby forming a set of scheduled inbound data packets; forward the set of scheduled inbound data packets to a wireless network interface for transmission to the first RTC/RTE device; receive a set of outbound data packets from the first RTC/RTE device from the wireless network interface, wherein the hardware data packet classifier applies the set of outbound data packet classification identifiers to the set of outbound data packets by the hardware data packet classifier to generate a set of classified outbound data packets; assign a same priority to data packets of a same class within the set of classified outbound data packets to generate a set of prioritized outbound data packets; schedule the set of prioritized outbound data packets for transmission, thereby forming a set of scheduled outbound data packets; and forward the set of scheduled outbound data packets to the wired network interface for transmission to the second RTC/RTE device over internet or local network. In one implementation, the wireless access point is a Wi-Fi access point and the predetermined port is a TCP port or a UDP port. The wireless access point application is further adapted to enable the hardware data packet classifier. In one implementation, the set of inbound packet classification identifiers includes at least one of an MAC address of the first RTC/RTE device, an MAC address of the second RTC/RTE device if it is in same L2 network with first RTC/RTE device, an IP address of the first RTC/RTE device, and an IP address of the second RTC/RTE device; and the set of outbound packet classification identifiers includes at least one of an MAC address of the first RTC/RTE device, an MAC address of the second RTC/RTE device if it is in same L2 network with first RTC/RTE device, an IP address of the first RTC/RTE device, and an IP address of the second RTC/RTE device. The wireless access point application is further adapted to bind the socket to the IP address; and listen to the socket for connection requests from RTC/RTE devices including the first RTC/RTE device.

Further in accordance with the present teachings is a wireless access point software application for classifying network data packets to improve packet forwarding performance. The wireless access point software application is adapted to be executed within a wireless access point and includes a real-time communication or real-time engagement (RTC/RTE) communication module for configuring and managing RTC/RTE communication with a first RTC/RTE device; and an RTC/RTE device management module for managing association between RTC/RTE devices and the wireless access point. The wireless access point includes a processing unit; a memory operatively coupled to the processing unit; a set of Light-Emitting Diode (LED) indicators operatively coupled to the processing unit; a wireless network interface operatively coupled to the processing unit; a power module operatively coupled to the processing unit; a wired wide area network interface operatively coupled to the processing unit; a hardware data packet classifier operatively coupled to the processing unit; and a Wi-Fi forwarding control module for priority mapping and transmitting packets based on packet priorities on the network interfaces of the wireless access point. The wireless access point software application also includes a Wi-Fi channel management module managing wireless communication channels and determining optimal channels for different communication needs; a packet transmit schedule module for scheduling all egress packet based on packet priorities on the network interfaces of the wireless access point; a Wi-Fi Basis Service Set (BSS) management module for creating and terminating BSSes; a packet classifier module for configuring a hardware classifier, identifying each ingress packet and setting priorities for packets; and a bandwidth detection module for determining and managing remaining bandwidth of the network interfaces of the wireless access point.

The wireless access point software application is adapted to create a socket with a predetermined port on an Internet Protocol (IP) address of the wireless access point by the RTC/RTE communication module; establish a connection with the first RTC/RTE device over the socket by the RTC/RTE communication module; receive a set of inbound data packet classification identifiers from the first RTC/RTE device by the RTC/RTE communication module; receive a set of outbound data packet classification identifiers from the first RTC/RTE device by the RTC/RTE communication module; provide the set of inbound data packet classification identifiers to a hardware data packet classifier by the packet classifier module; provide the set of outbound data packet classification identifiers to a hardware data packet classifier by the packet classifier module; receive a set of inbound data packets from a second RTC/RTE device from the wired wide area network interface of the wireless access point by the RTC/RTE communication module, wherein the hardware data packet classifier applies the set of inbound data packet classification identifiers to the set of inbound data packets by the hardware data packet classifier to generate a set of classified inbound data packets; assign a same priority to data packets of a same class within the set of classified inbound data packets to generate a set of prioritized inbound data packets by the packet classifier module; schedule the set of prioritized inbound data packets for transmission, thereby forming a set of scheduled inbound data packets by the packet transmit schedule module; forward the set of scheduled inbound data packets to the wireless network interface for transmission to the first RTC/RTE device by the Wi-Fi forwarding control module; receive a set of outbound data packets from the first RTC/RTE device from the wireless network interface by the RTC/RTE communication module, wherein the hardware data packet classifier applies the set of outbound data packet classification identifiers to the set of outbound data packets by the hardware data packet classifier to generate a set of classified outbound data packets; assign a same priority to data packets of a same class within the set of classified outbound data packets to generate a set of prioritized outbound data packets by the packet classifier module; schedule the set of prioritized outbound data packets for transmission, thereby forming a set of scheduled outbound data packets by the packet transmit schedule module; and forward the set of scheduled outbound data packets to the wired wide area network interface for transmission to the second RTC/RTE device In one implementation, the wireless access point is a Wi-Fi access point and the predetermined port is a Transmission Control Protocol (TCP) port or a User Datagram Protocol (UDP) port. The wireless access point software application is further adapted to enable the hardware data packet classifier. The set of inbound packet classification identifiers includes at least one of a Media Access Control (MAC) address of the first RTC/RTE device, a MAC address of the second RTC/RTE device, an IP address of the first RTC/RTE device, and an IP address of the second RTC/RTE device. The set of outbound packet classification identifiers includes at least one of a MAC address of the first RTC/RTE device, a MAC address of the second RTC/RTE device, an IP address of the first RTC/RTE device, and an IP address of the second RTC/RTE device. The wireless access point software application is further adapted to bind the socket to the predetermined port, wherein the predetermined port is a Transmission Control Protocol (TCP) port or a User Datagram Protocol (UDP) port; and listen to the socket for connection requests from RTC/RTE devices including the first RTC/RTE device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
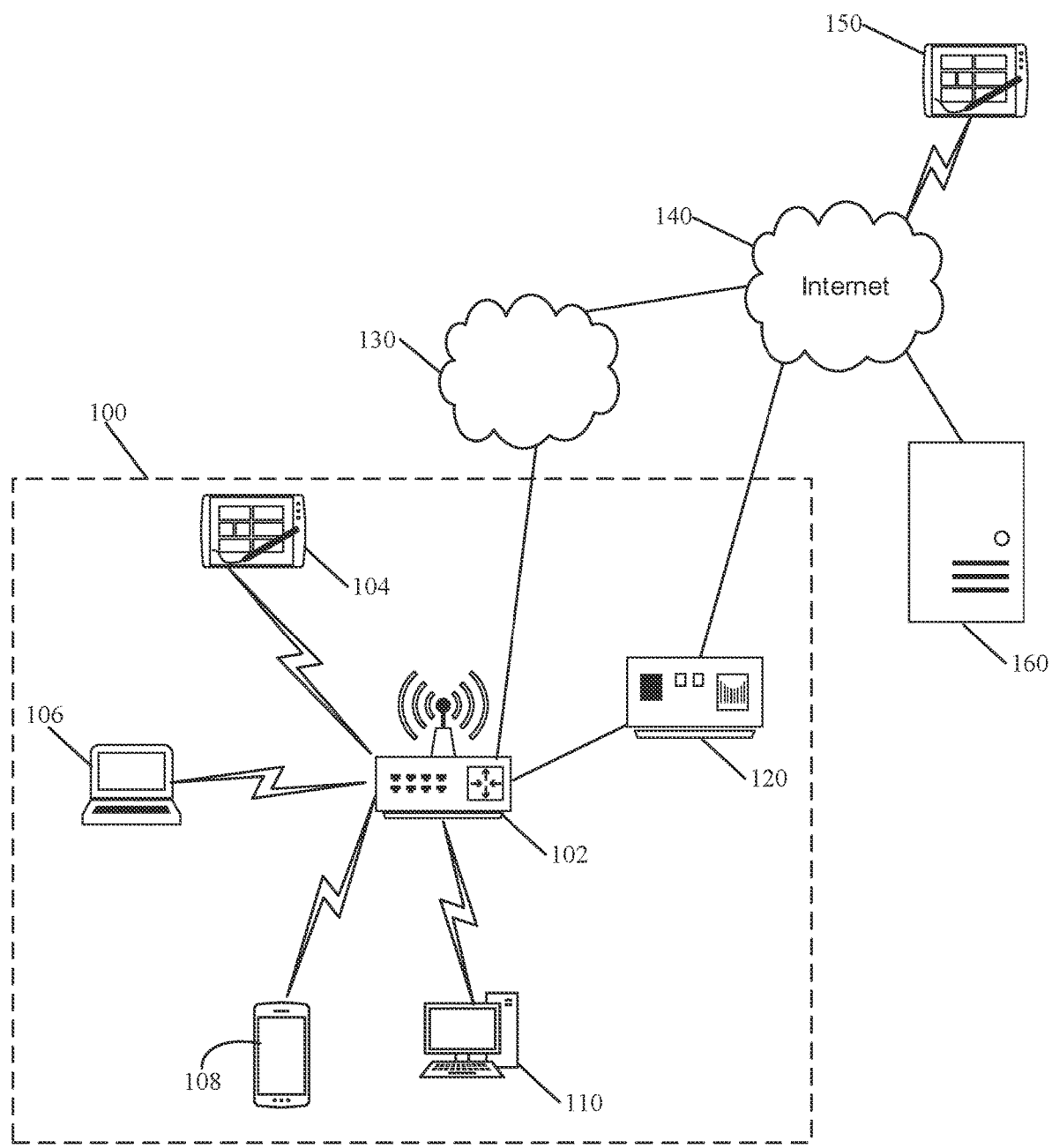
FIG. 1 is an illustrative block diagram of a Wi-Fi wireless network in accordance with the teachings of this disclosure.

Turning to the Figures and to FIG. 1 in particular, an illustrative block diagram of a wireless communication network is shown and generally indicated at 100. The Wi-Fi network 100 includes a Wi-Fi access point 120 connecting to the Internet 140 via the broadband modem 120 or a public cellular network 130, and a set of electronic devices, such as the tablet computer 104, the laptop computer 106, the smartphone 108 and the desktop computer 110. The electronic devices 104-108 are mobile devices. The devices 104-110 each run an improved RTC/RTE software application while the Wi-Fi access point 102 runs an improved Wi-Fi access point software application. As used herein, a wireless networked device running an RTC/RTE software application is referred to as an RTC/RTE device. An RTC/RTE device (such as the devices 104-110) communicates with a remote RTC/RTE device 150 over the Internet 140 via the wireless access point 102. Furthermore, the RTC/RTE device communicates with an RTC/RTE server 160 over the Internet 140 via the access point 102. The RTC/RTE server 160 runs an RTC/RTE server software application for managing RTC/RTE sessions with multiple participating RTC/RTE devices.

Figure 2:
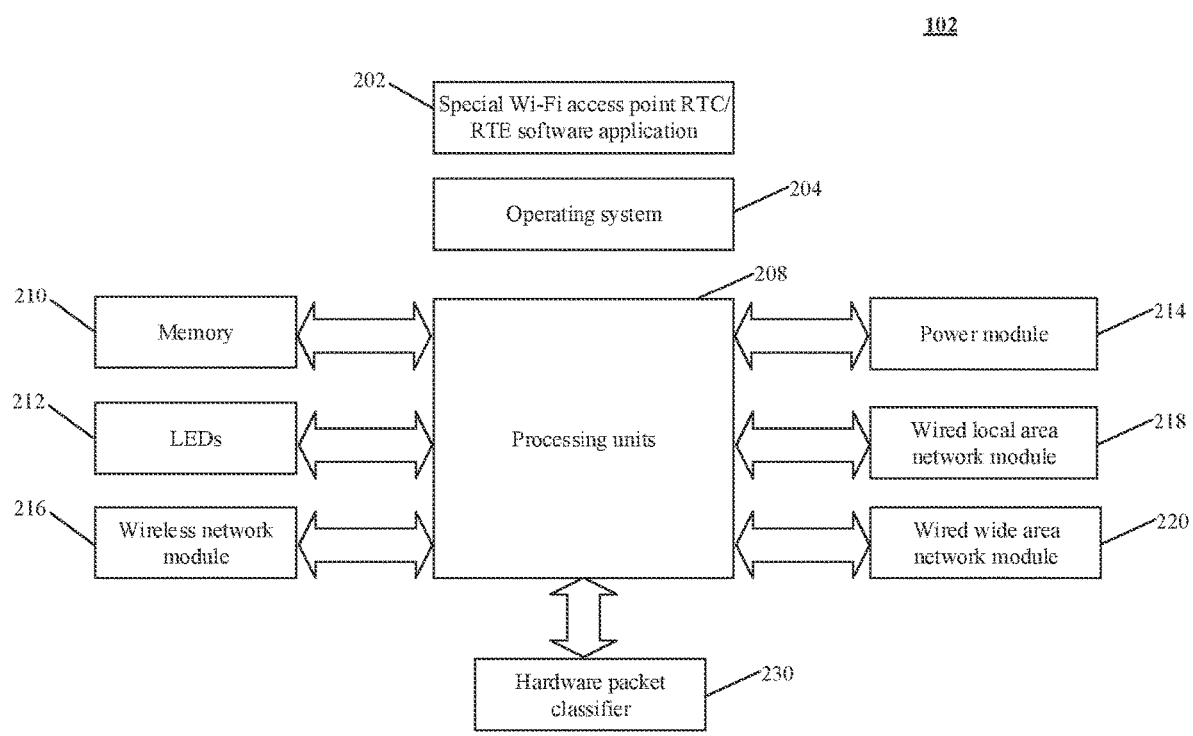
FIG. 2 is illustrative block diagram of a Wi-Fi wireless network access point in accordance with this disclosure.

The improved Wi-Fi access point 102 is further illustrated by reference to FIG. 2. Turning to FIG. 2, an illustrative block diagram of the Wi-Fi access point 102 is shown. The Wi-Fi access point 102 include a processing unit 208, some amount of memory 210 operatively coupled to the processing unit 208, a set of Light-Emitting Diode (LED) indicators 212 operatively coupled to the processing unit 208, a Wi-Fi wireless network module 216 operatively coupled to the processing unit 208, a power module 214 operatively coupled to the processing unit 208, a wired local area network module (such as Ethernet network) 218 operatively coupled to the processing unit 208, a wired wide area network module 220 operatively coupled to the processing unit 208 for interfacing with the Internet gateway 120, and a hardware network data packet classifier 230 operatively coupled to the processing unit 208. The Wi-Fi access point 102 include an operating system 204, such as the LEDE/OpenWRT operating system, and Linux operating systems.

Figure 3:
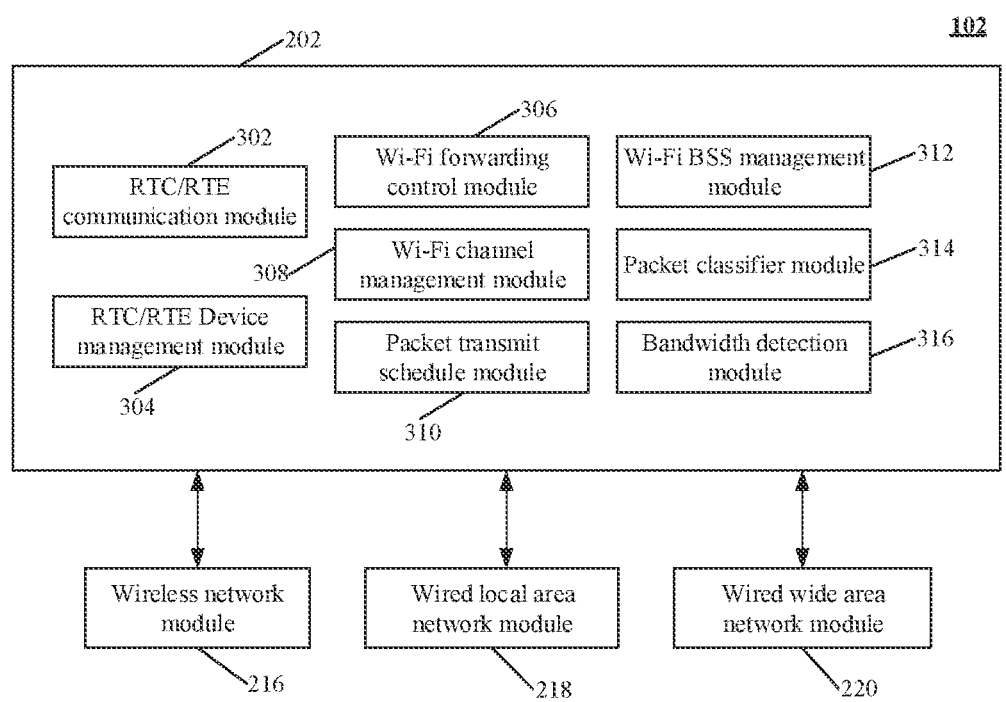
FIG. 3 is illustrative block diagram of a Wi-Fi wireless network access point in accordance with this disclosure.

The improved Wi-Fi access point 102 further includes a special Wi-Fi access point software application 202 in accordance with the present teachings. The special Wi-Fi access point software application 202 is further illustrated by reference to FIG. 3. Referring now to FIG. 3, an illustrative block diagram of the Wi-Fi access point 102 is shown. The special Wi-Fi access point software application 202 is one or more computer software programs written in one or more computer programming languages, such as C, C++, Java etc.

The improved Wi-Fi access point software application 202 includes an RTC/RTE communication module 302 for configuring and managing the RTC/RTE communication with the mobile devices 104-108, an RTC/RTE device management module 304 for managing the association between RTC/RTE devices and the Wi-Fi access point 102, a Wi-Fi forwarding control module 306 for priority mapping and transmitting packet based on the packet priority on the network interfaces 216-220, a Wi-Fi channel management module 308 for managing wireless communication channels and determining the optimal channels for different communication needs, a packet transmit schedule module 310 for scheduling all egress packet based on packet priority on the network interfaces 216-220, a Wi-Fi Basis Service Set (BSS) management module 312 for creating and terminating BSSes, a packet classifier module 314 for configuring a hardware classifier, identifying each ingress (meaning inbound) packet and setting a priority for the packet, and a bandwidth detection module 316 for determining and managing remaining bandwidth of the network interfaces 216-220.

In one implementation, the packet classifier module 314 configures the hardware network data packet classifier 230 by accessing a device driver for the hardware classifier 230. The device driver provides application programming interface for accessing it. For instance, the packet classifier module 314 accesses the driver to provide packet identifiers. The packet classifier module 314 may also accesses the driver to enable the hardware classifier, meaning activating it and turning it on. The hardware packet classifier 230 implements a logic for classifying inbound and outbound network data packet based on network data packet classification identifiers. The hardware packet classifier 230 is a hardware component, not a software application component.

Each of the devices 104-110 includes a processing unit, some amount of memory operatively coupled to the processing unit, a display screen operatively coupled to the processing unit, a wireless network interface operatively coupled to the processing unit and configured to communicate with the Wi-Fi access point 102, and an operating system (such as iOS, Android, MAC and Windows 10). They may each include one or more user input interfaces, such as a voice input interface, a touch panel, a mouse, a keyboard, etc.

Figure 4:
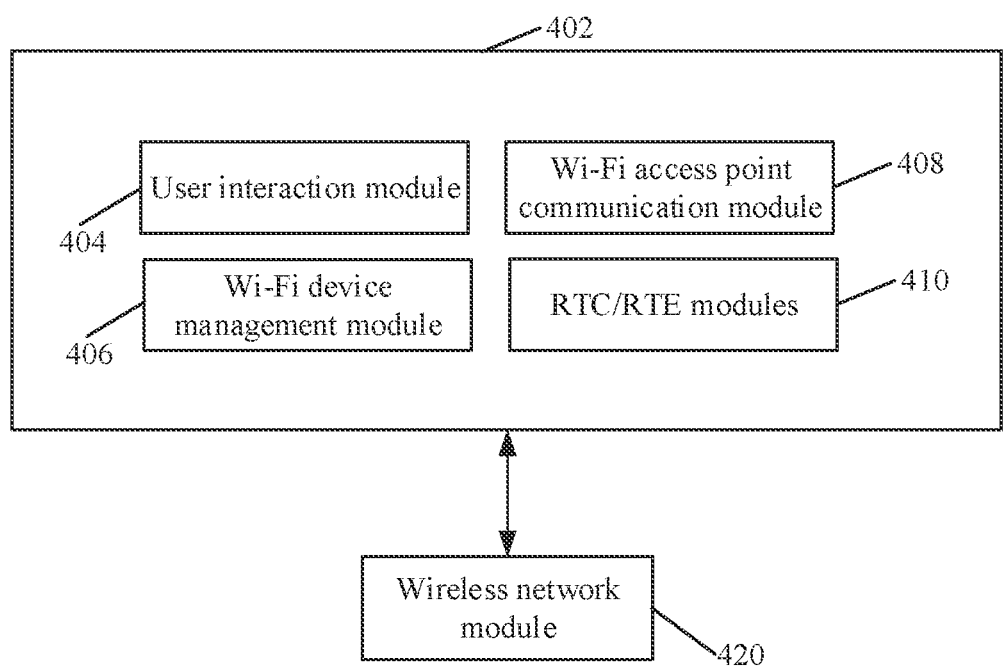
FIG. 4 is illustrative block diagram of a wireless RTC/RTE software application running on an RTC/RTE device in accordance with this disclosure.

Referring to FIG. 4, an illustrative block diagram of the RTC/RTE software application running on a mobile device (such as the electronic devices 104-110) is shown and generally indicated at 402. The special RTC/RTE software application 402 is one or more computer software programs written in one or more computer programming languages, such as C, C++, Java, etc. The RTC/RTE application 402 communicates with the same or different RTC/RTE software applications running other remote electronic devices via the wireless network interface 420 of the mobile device. The RTC/RTE program 402 includes a set of components. In one implementation, it includes a user interaction module 404 for interacting with a user of the RTC/RTE software application 402, a Wi-Fi device management module 406 for accessing and managing the wireless network device 420, an Wi-Fi access point communication module 408 for configuring the wireless connection and exchanging data with the Wi-Fi access point 102, and one or more RTC/RTE modules 410 for providing RTC/RTE functionality, such as video and audio modules.

Figure 5:
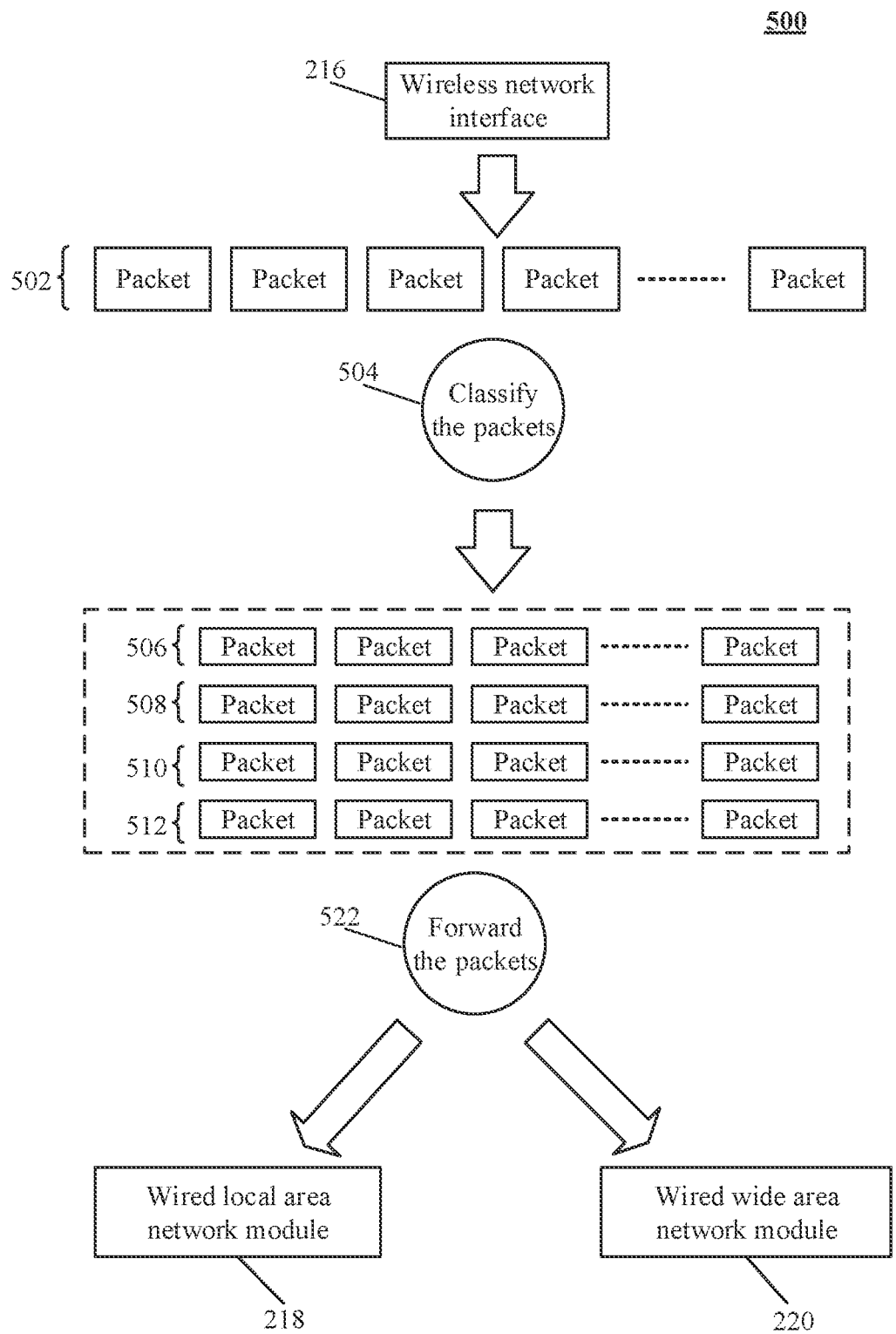
FIG. 5 is a simplified block diagram illustrating a network data packet outbound flow in accordance with this disclosure.

Referring now to FIG. 5, a network data packet outbound flow is shown and generally indicated at 500 and 600 respectively. The wireless access point 102 receives a set of network data packets 502 from its wireless network interface 216. The data packets 502 are sent from the RTC/RTE software application running on an RTC/RTE device (such as the devices 104 or 106-110) and destined for the remote RTC/RTE device 150. The data packets 502 are thus upstream data (also referred to herein as outbound data packets and egress data packets) of the RTC/RTE device 104. At 504, the wireless access point 102 classifies the egress packets 502. Traditionally, the classification is performed by scanning the data content inside the data packets 502 to determine the types of the data, such as video, audio, network control data, time-critical or not, etc., based on the identified types, priorities are assigned to the packets. The scanning process is time consuming, consumes the resources of the processing unit 208 of the access point 102, and adversely affects the performance of the access point 102.

The present disclosure teaches a new solution to the packet classification problems. The RTC/RTE software application provides the classification identifiers to the access point 102. The access point 102 then classifies the data packets by identifying data packets to and from the RTC/RTE software application based the classification identifiers without the traditional scanning. In a further implementation, the improved access point 102 provides the classification identifier to a hardware classifier, has the classification performed by the hardware classifier 230 to reduce reliance on the resources of the processing unit 208, and thus improves the performance of the access point 102. It further speeds up the transmission of the data packets since less time is used in the classification process.

The data packets 502 with different priorities are then categorized into different data packet queues (or lists) 506, 508, 510 and 512. The data packet queues 506-512 are of different priorities. Data packets in the same queue has the same priority for transmission. At 522, the access point 102 sends the data packets in the queues 506-512 to the target network interfaces 218-220 with the data packets in the queue with higher priority transmitted first. For example, the data packets destined to the remote RTC/RTE device 150 are forwarded to the wired wide area network interface 220.

Figure 6:
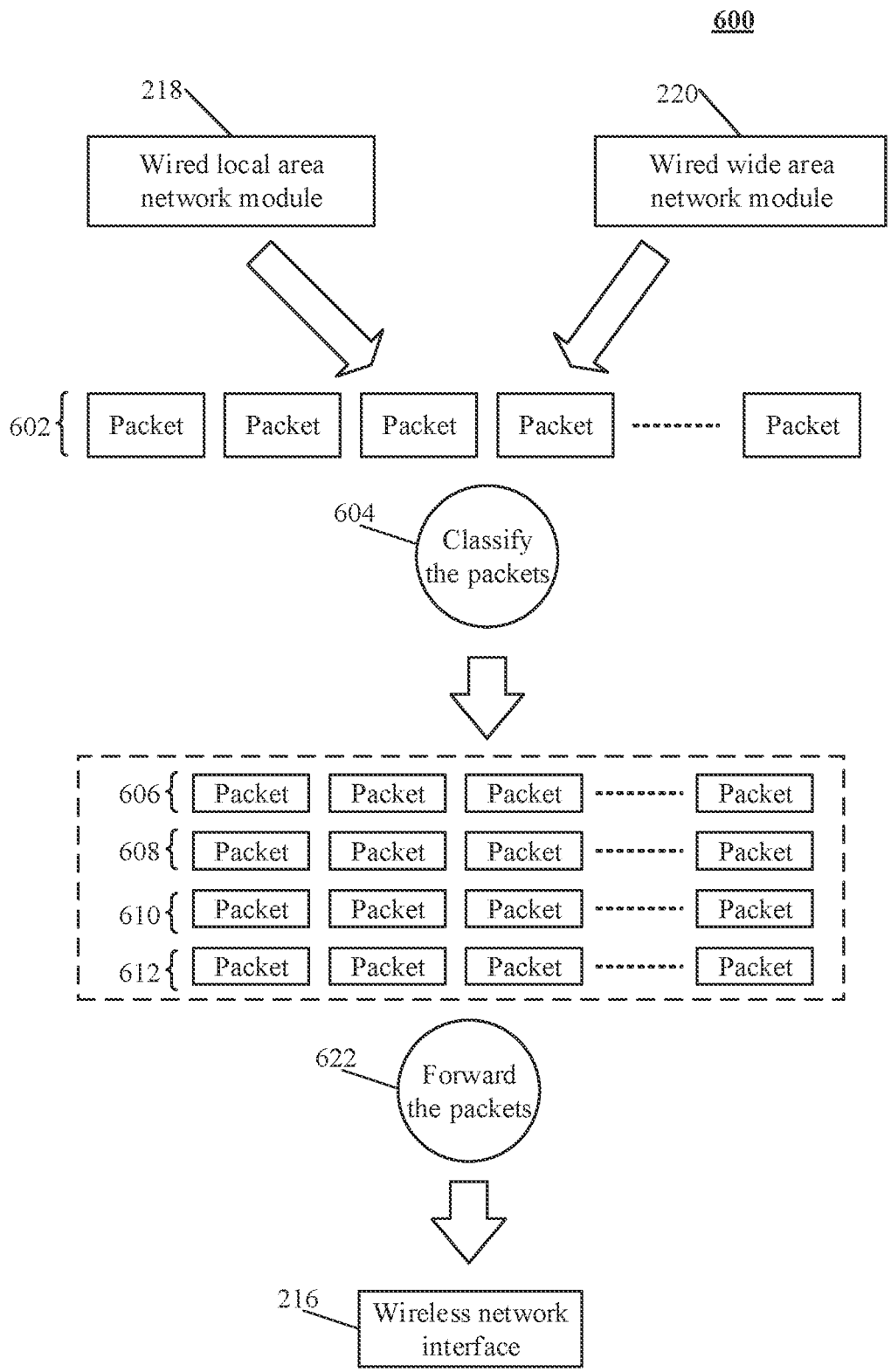
FIG. 6 is a simplified block diagram illustrating a network data packet inbound flow in accordance with this disclosure.

Similar to the outbound traffic flow, the network data packet inbound flow for the RTC/RTE device 104 is illustrated by reference to FIG. 6. The improved access point 102 receives a set of network data packets 602 from the wired local area network interface (such as an Ethernet network interface) 218 and/or the wired wide area network interface 220. For example, data packets from the remote RTC/RTE device 150 to the RTC/RTE device 104 are received from the wired wide area network interface 220. At 604, the wireless access point 102 classifies the ingress packets 602 with classification identifiers provided by the RTC/RTE devices 104-110. The classified data packets are then placed in data packet queues 606, 608, 610 and 612 of different priorities. At 622, the access point 622 forwards the inbound data packets to the wireless network interface 216 based on the priorities of the queues 606-612.

For egress data packet classification, in one implementation, the RTC/RTE device 104 provides the Media Access Control ("MAC") address of its wireless network interface 216 to the access point 102 as the classification identifier. In a different implementation, the RTC/RTE device 104 provides its Internet Protocol ("IP") address to the Wi-Fi access point 102 as the classification identifier. For the ingress data packet classification, in one implementation, the RTC/RTE device 104 provides the IP addresses of the remote RTC/RTE devices (such as the RTC/RTE device 15) to the access point 102 as the classification identifiers. In a different implementation, the RTC/RTE device 104 provides MAC addresses of other RTC/RTE devices to the Wi-Fi access point 102 as the classification identifier. The process by which the RTC/RTE device 104 obtains the IP addresses and/or MAC addresses of other RTC/RTE devices is further illustrated by reference to FIG. 7.

Figure 7:
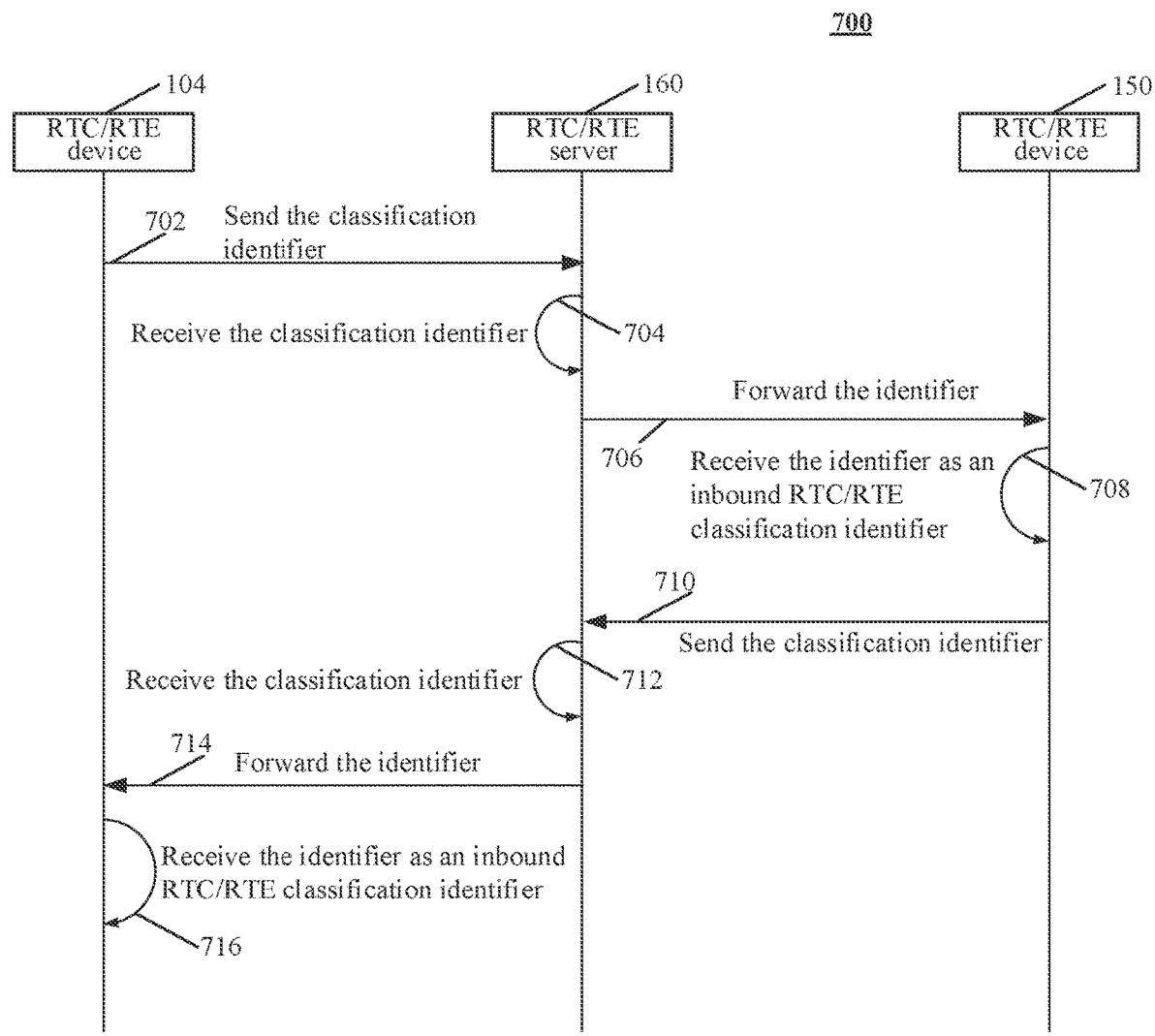
FIG. 7 is a flowchart illustrating a process by which an RTC/RTE device provides obtains data packet classification identifiers in accordance with this disclosure.

Referring to FIG. 7, a flowchart illustrating process by which the RTC/RTE software application 402 running on the RTC/RTE device 104 (or the devices 106-110) obtains data packet classification identifiers is shown and generally indicated at 700. At 702, the RTC/RTE software application 402 communicates with the RTC/RTE server software application running on the RTC/RTE server 160 to send its inbound data packet classification identifiers. The provision can be an independent message or part of another message, such as a registration message for participating an RTC/RTE session, such as a video meeting. The inbound data packet classification identifier can be, for example, the IP address or the MAC address of the RTC/RTE device 104. At 704, the RTC/RTE server software application receives the identifier. At 706, the RTC/RTE server software application forwards the identifier to the RTC/RTE device 150. At 708, the RTC/RTE software application running on the RTC/RTE device 150 receives the identifier, which it later forwards to its wireless access point as one of its inbound data packet classification identifiers.

At 710, the RTC/RTE software application running on the RTC/RTE device 150 communicates with the RTC/RTE server software application running on the RTC/RTE server 160 to provide its inbound data packet classification identifier (such as the IP address or the MAC address of the RTC/RTE device 150) to the RTC/RTE server 160. At 712, the RTC/RTE server software application receives the identifier. At 714, the RTC/RTE server software application forwards the identifier to the RTC/RTE device 104. At 708, the RTC/RTE software application 402 running on the RTC/RTE device 104 receives the identifier, which it later forwards to its wireless access point 102 as one of its inbound data packet classification identifiers.

Figure 8:
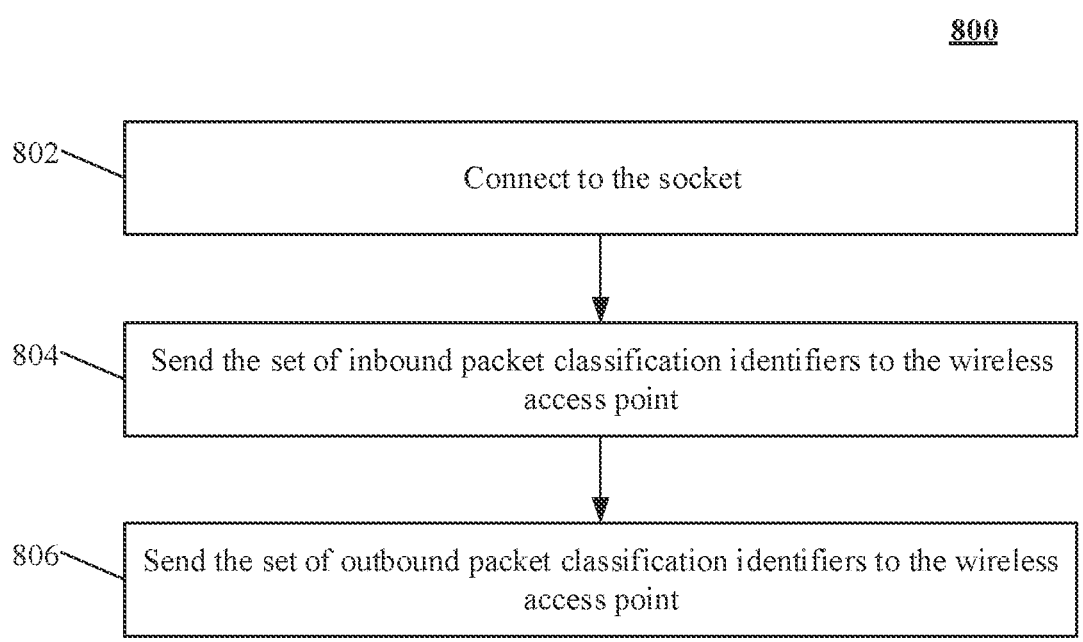
FIG. 8 is a flowchart illustrating a process by which an RTC/RTE device provides classification identifiers to a wireless access point in accordance with this disclosure.

Referring to FIG. 8, a flowchart illustrating a process by which the RTC/RTE device 104 provides its data packet classification identifiers to the wireless access point 102 is shown and generally indicated at 800. At 802, the RTC/RTE software application 402 running on the RTC/RTE device 104 connects to the Wi-Fi access point software application 202 over a socket created by the wireless access point 102. At 804, the RTC/RTE software application 402 sends a set of inbound data packet classification identifiers to the Wi-Fi access point software application 202. The set of inbound data packet classification identifiers includes, for example, the IP addresses of other RTC/RTE devices (such as the RTC/RTE device 150). In a different implementation, the set of inbound data packet classification identifiers includes the MAC addresses of other RTC/RTE devices. For inbound data packets to the RTC/RTE device 102, the IP and MAC addresses of other RTC/RTE devices are the source addresses. In a further different implementation, the set of inbound data packet classification identifiers includes the IP address or MAC address of the RTC/RTE device 104. For inbound data packets to the RTC/RTE device 102, this IP and MAC address of the RTC/RTE device is the destination addresses.

At 806, the RTC/RTE software application 402 sends a set of outbound data packet classification identifiers to the Wi-Fi access point software application 202. The set of outbound data packet classification identifiers includes, for example, the source MAC addresses of the RTC/RTE device 104. In a different implementation, the set of outbound data packet classification identifiers includes the source IP addresses of the RTC/RTE device 104. In a further different implementation, the set of outbound data packet classification identifiers includes the destination IP addresses or MAC addresses of other RTC/RTE devices, such as the RTC/RTE device 150.

Figure 9:
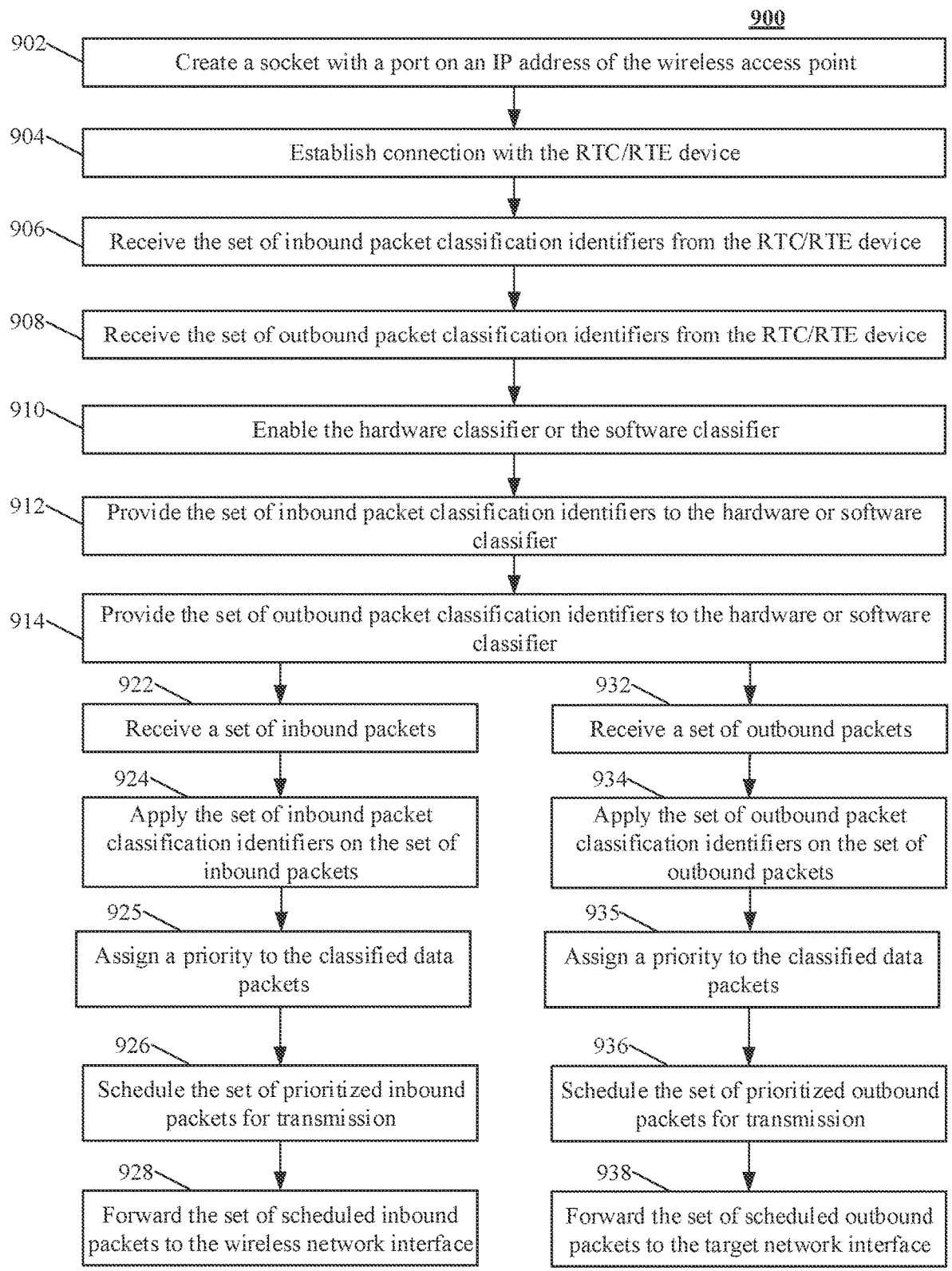
FIG. 9 is a flowchart illustrating a process by which a wireless access point retrieves data packet classification identifiers and uses the same to classify network data packets in accordance with this disclosure.

The process by which the wireless access point 102 obtains data packet classification identifiers from RTC/RTE devices and applies the same is further illustrated by reference to FIG. 9. Referring to FIG. 9, the process is shown and generally indicated at 900. At 902, the new wireless access point application 202 creates a socket with a predetermined TCP port or an UDP port, binds the socket to an IP address of the Wi-Fi access point 102, and listens on the socket for connection requests from the RTC/RTE application 402 running on different RTC/RTE devices (such as the devices 104-110). TCP stands for Transmission Control Protocol while UDP stands for User Datagram Protocol. At 904, the access point application 202 accepts the connection request from the RTC/RTE device 104 and establishes a connection between the special applications 202 and 402. At 906, the access point application 202 receives the set of inbound packet classification identifiers from the RTC/RTE device 104 sent at 804. At 908, the access point application 202 receives the set of outbound packet classification identifiers from the RTC/RTE device 104 sent at 806. The access point application 202 may also receive inbound and outbound network data packet classification identifiers from other RTC/RTE devices as well.

Figure 10:
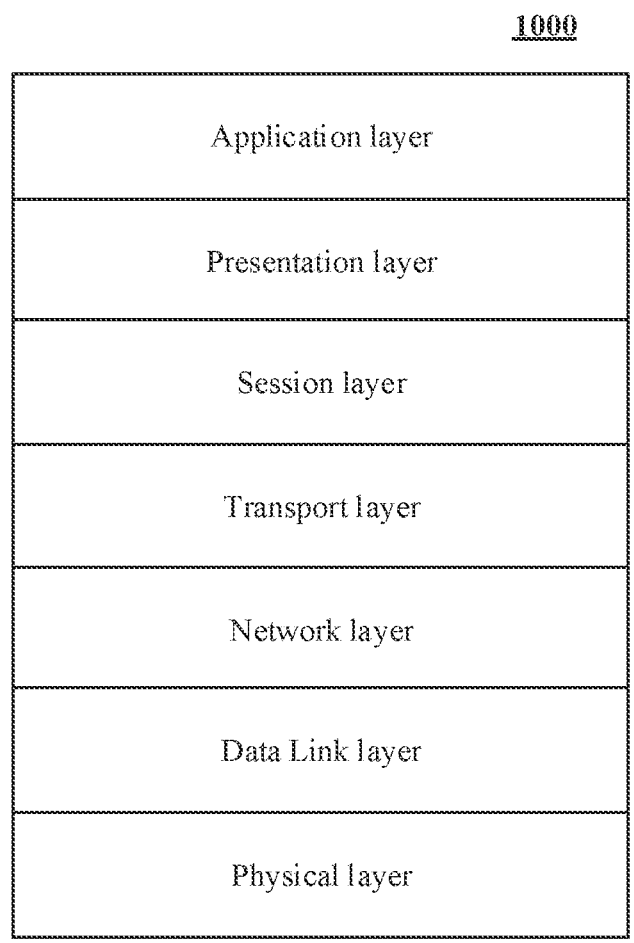
FIG. 10 is a block diagram illustrating the prior art OSI network model in accordance with this disclosure.

At 910, the access point application 202 enables or activates a network data packet classifier, which can be the hardware classifier 230 or a software classifier. The hardware classifier 230 is implemented as a hardware component. The software classifier is implemented by as a computer software program managed by the operating system 204 during execution. When implemented as a software classifier, the network data packet classifier is a component of the wireless access point software application 202. The enablement or activation can be a call to an application programming interface ("API") provided by, for example, a device driver of the hardware classifier 230. The enablement can also be turning on a flag or setting a value to a variable. The hardware classifier 230 corresponds to the data link layer, the network layer, the transport layer or the application layer of the OSI model 1000 shown in FIG. 10.

At 912, the access point application 202 provides the set of inbound packet classification identifiers to the hardware packet classifier 230. In a different implementation, the classifier is a software classifier. At 914, the access point application 202 provides the set of outbound packet classification identifiers to the packet classifier, such as the hardware packet classifier 230. For example, the packet classifier 314 provides the two sets of packet classification identifiers to the hardware packet classifier 230 by calling an API provided by the device driver of the hardware packet classifier 230. Alternatively, they are placed in a memory location or a message accessible by the hardware packet classifier 230.

At 922, the wireless access point 102 receives a set of inbound data packets from the network interface 216 or 220. At 924, the hardware packet classifier 230 applies the set of inbound packet classification identifiers on the set of inbound packets to classify the set of inbound packets. The result is a set of classified inbound data packets. This set includes a number of subsets of classified outbound data packets with each subset of the same class. For example, if the set of inbound packet classification identifiers includes the IP addresses of the RTC/RTE devices 104 and 150 and the packet classifier 314 determines that the source IP address is that of the RTC/RTE device 150 and the destination IP address of the set of packets is that of the RTC/RTE device 104, the packet classifier 314 determines that the set of data packets are RTC/RTE data packets.

In one implementation, the hardware packet classifier 230 determines whether a data packet contains a particular network data packet classification identifier by performing a bit-wise AND operation with the classification identifier contained in a mask: packet & mask. The result of the logical AND operation is checked to determine whether a match against the identifier is found or not.

At 925, the packet classifier module 314 assigns a predetermined priority to each data packet of the same class within the set of classified inbound data packets. The result is a set of prioritized inbound data packets. This set includes a number of subsets of inbound data packets with each subset of the same priority. The priority for RTC/RTE data packets is set to a higher value to maintain or improve the immediacy of RTC/RTE communication. In one implementation, the priority is a data field of three bits in a header. In this example, a data packet classifier within the set includes two data parts—the source IP address and the destination IP address. In a different implementation, the data packet identifier includes the source MAC address and the destination MAC address of, for example, the RTC/RTE devices 150 and 104 respectively. In a further different implementation, the data packet includes one IP address and one MAC address between the RTC/RTE devices 104 and 150.

At 926, the access point 102 schedules the prioritized set of inbound data packets for transmission. The result is a set of scheduled inbound data packets. For instance, the scheduling is performed by the packet transmit schedule module 310. At 928, the access point 102 forwards the scheduled set of inbound data packets to the wireless network interface 216 for the RTC/RTE device 104. For example, the Wi-Fi forwarding control module 306 forwards the set of packets to the wireless network interface 216. With the classification of the inbound packets, the performance of forwarding of the packets from the network interface 220 to the wireless network interface 216 is significantly improved.

At 932, the access point 102 receives a set of outbound packets from the wireless network interface 216. For example, the set of outbound data packets is from the RTC/RTE device 104 for the RTC/RTE device 150. At 934, the hardware packet classifier 230 applies the set of outbound data packet classification identifiers on the set of outbound packets to classify the set of packets. The result is a set of classified outbound data packets. This set includes a number of subsets of classified outbound data packets with each subset of the same class. For example, if the set of inbound packet classification identifiers includes the IP addresses of the RTC/RTE devices 104 and 150 and the packet classifier 314 determines that the source IP address is that of the RTC/RTE device 104 and the destination IP address of the set of packets is that of the RTC/RTE device 150, the packet classifier 314 determines that the set of data packets are RTC/RTE data packets, and assign a predetermined priority to the set of data packets. The priority for RTC/RTE data packets is set to a higher value to maintain or improve the immediacy of RTC/RTE communication. In this example, a data packet classifier within the set includes two data parts—the source IP address and the destination IP address. In a different implementation, the data packet identifier includes the source MAC address and the destination MAC address of, for example, the RTC/RTE devices 150 and 104 respectively. In a further different implementation, the data packet includes the IP address of the RTC/RTE device 150 and the MAC address of the RTC/RTE device 104.

At 935, the packet classifier module 314 assigns a predetermined priority to each data packet of the same class within the set of classified inbound data packets. The result is a set of prioritized inbound data packets. This set includes a number of subsets of inbound data packets with each subset of the same priority. At 936, the access point 102 schedules the prioritized set of outbound data packets for transmission. The result is a set of scheduled inbound data packets. For instance, the scheduling is performed by the packet transmit schedule module 310. At 938, the access point 102 forwards the scheduled set of outbound data packets to the wired wide area network interface 220 for the RTC/RTE device 150. For example, the Wi-Fi forwarding control module 306 forwards the set of packets to the wired wide area network interface 220. With the classification of the outbound packets, the performance of forwarding of the packets from the wireless network interface 216 to the network interface 220 is significantly improved.

Obviously, many additional modifications and variations of the present disclosure are possible in light of the above teachings. Thus, it is to be understood that, within the scope of the appended claims, the disclosure may be practiced otherwise than is specifically described above. For example, the RTC/RTE device 104 provides the source and destination TCP/UDP port numbers to the access point 102 as the data packet classification identifiers. As another example, the classification identifiers are specified as a DSCP/TOS value in IP packet headers. DSCP stands for Differentiated Services Code Point while TOS stands for Type of Service in IP.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A wireless access point software application for classifying network data packets to improve packet forwarding performance, said wireless access point software application adapted to be executed within a wireless access point and comprising:
   1) a real-time communication or real-time engagement (RTC/RTE) communication module for configuring and managing RTC/RTE communication with a first RTC/RTE device;
   2) an RTC/RTE device management module for managing association between RTC/RTE devices and said wireless access point, said wireless access point including:
      a. a processing unit;
      b. a memory operatively coupled to said processing unit;
      c. a set of Light-Emitting Diode (LED) indicators operatively coupled to said processing unit;
      d. a wireless network interface operatively coupled to said processing unit;
      e. a power module operatively coupled to said processing unit;
      f. a wired wide area network interface operatively coupled to said processing unit;
      g. a hardware data packet classifier operatively coupled to said processing unit; and
   3) a Wi-Fi forwarding control module for priority mapping and transmitting packets based on packet priorities on said network interfaces of said wireless access point;
   4) a Wi-Fi channel management module managing wireless communication channels and determining optimal channels for different communication needs;
   5) a packet transmit schedule module for scheduling all egress packet based on packet priorities on said network interfaces of said wireless access point;
   6) a Wi-Fi Basis Service Set (BSS) management module for creating and terminating BSSes;
   7) a packet classifier module for configuring a hardware classifier, identifying each ingress packet and setting priorities for packets;
   8) a bandwidth detection module for determining and managing remaining bandwidth of said network interfaces of said wireless access point; and
   9) said wireless access point software application adapted to:
      a. create a socket with a predetermined port of an Internet Protocol (IP) address of said wireless access point by said RTC/RTE communication module;
      b. establish a connection with said first RTC/ITE device over said socket by said RTC/RTE communication module;
      c. receive a set of inbound data packet classification identifiers from said first RTC/RIE, device by said RTC/RTE communication module;
      d. receive a set of outbound data packet classification identifiers from said first RTC/RTE device by said RTC/RTE communication module;
      e. provide said set of inbound data packet classification identifiers to a hardware data packet classifier by said packet classifier module;
      f. provide said set of outbound data packet classification identifiers to a hardware data packet classifier by said packet classifier module;
      g. receive a set of inbound data packets from a second RTC/RTE device from said wired wide area network interface of said wireless access point by said RTC/RTE communication module, wherein said hardware data packet classifier applies said set of inbound data packet classification identifiers to said set of inbound data packets by said hardware data packet classifier to generate a set of classified inbound data packets;
      h. assign a same priority to data packets of a same class within said set of classified inbound data packets to generate a set of prioritized inbound data packets by said packet classifier module;
      i. schedule said set of prioritized inbound data packets for transmission, thereby forming a set of scheduled inbound data packets by said packet transmit schedule module;
      j. forward said set of scheduled inbound data packets to said wireless network interface for transmission to said first RTC/RTE device by said Wi-Fi forwarding control module;

k. receive a set of outbound data packets from said first RTC/RTE device from said wireless network interface by said RTC/RTE communication module, wherein said hardware data packet classifier applies said set of outbound data packet classification identifiers to said set of outbound data packets by said hardware data packet classifier to generate a set of classified outbound data packets;

l. assign a same priority to data packets of a same class within said set of classified outbound data packets to generate a set of prioritized outbound data packets by said packet classifier module;

m. schedule said set of prioritized outbound data packets for transmission, thereby forming a set of scheduled outbound data packets by said packet transmit schedule module; and n. forward said set of scheduled outbound data packets to said wired wide area network interface for transmission to said second RTC/RTE device.

2. The wireless access point software application of claim 1 wherein said wireless access point is a Wi-Fi access point and said predetermined port is a Transmission Control Protocol (TCP) port or a User Datagram Protocol (UDP) port.

3. The wireless access point software application of claim 1 wherein said wireless access point software application is further adapted to enable said hardware data packet classifier.

4. The wireless access point software application of claim 3 wherein:
1) said set of inbound packet classification identifiers includes at least one of a Media Access Control (MAC) address of said first RTC/RTE device, a MAC address of said second RTC/RTE device, an IP address of said first RTC/RTE device, and an IP address of said second RTC/RTE device; and
2) said set of outbound packet classification identifiers includes at least one of a MAC address of said first RTC/RTE device, a MAC address of said second RTC/RTE device, an IP address of said first RTC/RTE device, and an IP address of said second RTC/RTE device.

5. The wireless access point software application of claim 4 wherein said wireless access point software application is further adapted to:
1) bind said socket to said predetermined port, wherein said predetermined port is a Transmission Control Protocol (TCP) port or a User Datagram Protocol (UDP) port; and
2) listen to said socket for connection requests from RTC/RTE devices including said first RTC/RTE device.

6. The wireless access point software application of claim 1 wherein said wireless access point software application is further adapted to enable said hardware data packet classifier.

7. The wireless access point software application of claim 6 wherein:
1) said set of inbound packet classification identifiers includes at least one of a MAC address of said first RTC/RTE device, a MAC address of said second RTC/RTE device, an IP address of said first RTC/RTE device, and an IP address of said second RTC/RTE device; and
2) said set of outbound packet classification identifiers includes at least one of a MAC address of said first RTC/RTE device, a MAC address of said second RTC/RTE device, an IP address of said first RTC/RTE device, and an IP address of said second RTC/RTE device.

* * * * *